(12) United States Patent
Chen

(10) Patent No.: US 11,054,969 B2
(45) Date of Patent: Jul. 6, 2021

(54) METHOD AND DEVICE FOR DISPLAYING PAGE OF ELECTRONIC BOOK, AND TERMINAL DEVICE

(71) Applicant: Zhangyue Technology Co., Ltd, Beijing (CN)

(72) Inventor: Xingang Chen, Beijing (CN)

(73) Assignee: Zhangyue Technology Co., Ltd, Beijing (CN)

( * ) Notice: Subject to any disclaimer, the term of this patent is extended or adjusted under 35 U.S.C. 154(b) by 0 days.

(21) Appl. No.: 16/498,346

(22) PCT Filed: Jun. 20, 2017

(86) PCT No.: PCT/CN2017/089262
§ 371 (c)(1),
(2) Date: Sep. 26, 2019

(87) PCT Pub. No.: WO2018/176653
PCT Pub. Date: Oct. 4, 2018

(65) Prior Publication Data
US 2020/0042146 A1 Feb. 6, 2020

(30) Foreign Application Priority Data
Mar. 30, 2017 (CN) .......................... 201710202333.6

(51) Int. Cl.
*G06F 3/0483* (2013.01)
*G06F 40/106* (2020.01)

(52) U.S. Cl.
CPC .......... *G06F 3/0483* (2013.01); *G06F 40/106* (2020.01)

(58) Field of Classification Search
CPC .......... G06F 3/048; G06F 40/00; G06F 3/017; G06F 40/10
See application file for complete search history.

(56) References Cited

U.S. PATENT DOCUMENTS 5,900,877 A * 5/1999 Weiss ...................... G06F 9/451
715/803
9,007,405 B1 * 4/2015 Eldar .................... G06F 3/0485
345/666

(Continued)

FOREIGN PATENT DOCUMENTS

| CN | 101256466 A | 9/2008 |
|---|---|---|
| CN | 101256467 A | 9/2008 |
| CN | 104156144 A | 11/2014 |

OTHER PUBLICATIONS

International Patent Application No. PCT/CN2017/089262; Int'l Search Report; dated Jan. 5, 2018; 2 pages.

*Primary Examiner* — Jennifer N To
*Assistant Examiner* — Qi Wan
(74) *Attorney, Agent, or Firm* — BakerHostetler

(57) ABSTRACT

Disclosed are a method and device for displaying page of electronic book, and a terminal device. The method for displaying page of electronic book includes: in response to receiving a page turning operation for a currently displayed image page of the electronic book, acquiring an edge color value and page content of the currently displayed image page; and drawing and displaying a folded portion with the edge color value and the page content, wherein the folded portion is a back portion of the turned currently displayed image page on which the page turning operation is performed.

16 Claims, 8 Drawing Sheets

(56) References Cited

U.S. PATENT DOCUMENTS

| | | | |
|---|---|---|---|
| 2001/0024195 A1* | 9/2001 | Hayakawa | G06F 3/04847 345/173 |
| 2007/0139707 A1* | 6/2007 | Takami | H04N 1/00461 358/1.15 |
| 2009/0222756 A1* | 9/2009 | Li | G06F 3/0483 715/776 |
| 2010/0175018 A1* | 7/2010 | Petschnigg | G06F 3/017 715/776 |
| 2012/0120432 A1* | 5/2012 | Hirohata | H04N 1/38 358/1.13 |
| 2013/0076758 A1* | 3/2013 | Li | G06F 3/0488 345/473 |
| 2013/0268847 A1* | 10/2013 | Kim | G06F 3/0483 715/251 |
| 2014/0067551 A1* | 3/2014 | Schaub | G06Q 30/0249 705/14.69 |
| 2014/0195890 A1* | 7/2014 | Taylor | G06F 16/00 715/234 |
| 2015/0149953 A1* | 5/2015 | McDougall | G06F 3/04847 715/781 |
| 2016/0085433 A1 | 3/2016 | Lee et al. | |
| 2018/0150978 A1* | 5/2018 | Li | G09G 3/2003 |

\* cited by examiner

METHOD AND DEVICE FOR DISPLAYING PAGE OF ELECTRONIC BOOK, AND TERMINAL DEVICE

CROSS-REFERENCE TO RELATED APPLICATIONS

This application is a U.S. national stage of International Application No. PCT/CN2017/089262, filed Jun. 20, 2017, which based upon and claims priority to Chinese Patent Application NO. 201710202333.6, titled "METHOD AND DEVICE FOR DISPLAYING PAGE of ELECTRONIC BOOK, AND TERMINAL DEVICE", filed Mar. 30, 2017, the entire contents of which are incorporated herein by reference.

This application is based upon and claims priority to Chinese Patent Application NO. 201710202333.6, titled "METHOD AND DEVICE FOR DISPLAYING PAGE of ELECTRONIC BOOK, AND TERMINAL DEVICE", filed Mar. 30, 2017, the entire contents of which are incorporated herein by reference.

TECHNICAL FIELD

The disclosure relates to the technical field of data processing, and in particular to a method and device for displaying a page of an electronic book, and a terminal device.

BACKGROUND

The electronic book is a publication in which words, pictures, sound and images are presented in a digitalization mode by means of the computer technology. With the increasingly wide application of the internet technology, the conventional paper reading mode is gradually replaced by the electronic book. People intend to download the electronic book for reading through a reading application.

While reading the electronic book, a user often turns pages of the electronic book. During the page turning operation, the electronic book page displays a corresponding page turning effect with a sliding operation of the user. In the whole display interface, content of a current page (a page which has been read) is displayed at a part of the display interface, content of a next page (a page which is to be read) is displayed in a part of the display interface, and a folded portion of the current page (that is a part of a back surface of the current page) is displayed in another part of the display interface, to display a complete page turning effect.

Presently, during the page turning process, the folded portion of the current page is generally displayed with a fixed color, for example, white or a preset sheet color. With such simple color display manner, the page color cannot be matched well during the page turning process, which influences the page display effect of the electronic book.

SUMMARY

A method and a device for displaying a page of an electronic book, and a terminal device are provided according to embodiments of the present disclosure, to solve the following problem: during a page turning process of the electronic book, page colors cannot be matched well, and thus influencing a page display effect of the electronic book.

According to an embodiment of the present disclosure, a method for displaying a page of an electronic book is provided, which includes: in response to receiving a page turning operation for a currently displayed image page of the electronic book, acquiring an edge color value and page content of the currently displayed image page, wherein the edge color value is a color value at a position within a preset distance away from an edge of the currently displayed image page; and drawing and displaying a folded portion with the edge color value and the page content, wherein the folded portion is a back portion of the turned currently displayed image page on which the page turning operation is performed.

According to an embodiment of the present disclosure, a device for displaying page of electronic book is provided, which includes: one or more processors; and a memory; wherein one or more programs are stored in the memory, and when executed by the one or more processors, the one or more programs cause the one or more processors to: acquire an edge color value and page content of a currently displayed image page of the electronic book, in response to receiving a page turning operation for the currently displayed image page, wherein the edge color value is a color value at a position within a preset distance away from an edge of the currently displayed image page; and draw and display a folded portion with the edge color value and the page content, wherein the folded portion is a back portion of the turned currently displayed image page on which the page turning operation is performed.

According to an embodiment of the present disclosure, a terminal device is provided, which includes: a processor, a memory, a communication interface and a communication bus, wherein the processor, the memory and the communication interface communicate with each other via the communication bus; and the memory is configured to store at least one executable instruction, wherein the executable instruction causes the processor to perform a method for displaying page of electronic book, the method for displaying page of electronic book comprising: in response to receiving a page turning operation for a currently displayed image page of the electronic book, acquiring an edge color value and page content of the currently displayed image page, wherein the edge color value is a color value at a position within a preset distance away from an edge of the currently displayed image page; and drawing and displaying a folded portion with the edge color value and the page content, wherein the folded portion is a back portion of the turned currently displayed image page on which the page turning operation is performed.

With the technical solution for displaying a page of an electronic book according to the embodiments of the present disclosure, when the user performs a page turning operation on the page of the electronic book particularly the image page of the electronic book which is being read, a device where the electronic book reading application is installed such as a mobile terminal and a desktop computer, firstly acquires, after receiving the page turning operation, the edge color value and the page content of the currently displayed image page of the electronic book, and thus draws the folded portion of the image page of the electronic book displayed during the page turning operation process according to the edge color value and the page content. In one aspect, as compared with the conventional method that the folded portion of the image page of the electronic book is displayed with a fixed color, with the method according to the present disclosure, the edge color value serves as a part of the colors of the image page of the electronic book, a matching degree with the image page of the electronic book is higher, and color matching is more harmonious, thereby effectively improving the display effect of the image page of the electronic book and improving reading experience of the user. In another aspect, as compared with the conventional method that color data for the whole page is collected and analyzed to analyze the page color, the edge color value can not only reflect the condition of the current image page of the electronic book, but also greatly reduce the data processing amount for collecting and analyzing of the color data, thereby improving the drawing and display efficiency of the electronic book and further improving the reading experience of the user.

DETAILED DESCRIPTION

Figure 1:
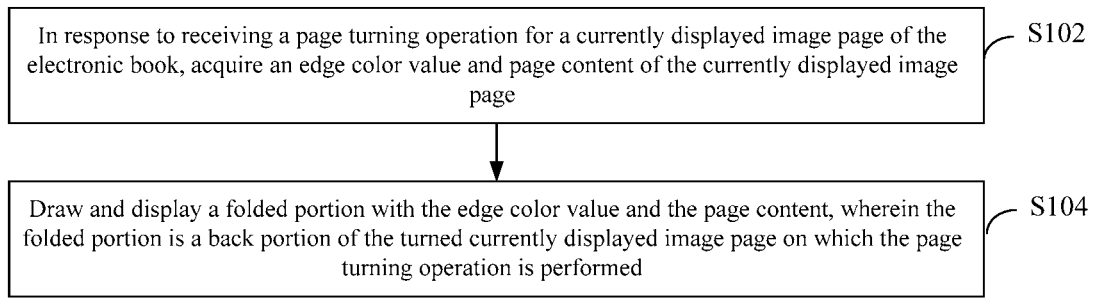
FIG. 1 is a flow chart of steps of a method for displaying a page of an electronic book in accordance with a first embodiment of the present disclosure.

Specific implementations of embodiments of the present disclosure are further described in detail in conjunction with drawings (the same reference numeral in several drawings indicates the same element) and embodiments hereinafter. The following embodiments are intended to illustrate the present disclosure rather than limit the scope of the present disclosure.

Those skilled in the art should understand that terms such as "first" and "second" in the embodiments of the present disclosure are only used to distinguish different steps, devices or modules, neither represent any specific technical meanings nor represent a necessary logic order therebetween.

First Embodiment

Reference is made to FIG. 1 which shows a flow chart of steps of a method for displaying a page of an electronic book in accordance with a first embodiment of the present disclosure.

The method for displaying a page of an electronic book according to the embodiment includes step S102 to step S104 as follows.

In step S102, in response to receiving a page turning operation for a currently displayed image page of the electronic book, an edge color value and page content of the currently displayed image page are acquired.

In the embodiment of the present disclosure, the image page of the electronic book means that the page of the electronic book contains an image and the image includes a portion overlapping with a boundary region of the page of the electronic book.

The boundary region of the page of the electronic book may be preset to be a region in which color pick-up of edge sheet is performed, for example a region within the preset distance away from an edge of the image page of the electronic book.

The edge color value is a color value at a position within a preset distance away from an edge of the currently displayed image page. The preset distance may be preset by those skilled in the art as required, and color pick-up may be performed in the edge region of the image page of the electronic book. For example, it is preset such that four edges of a page are one pixel or one millimeter away from four boundaries of the image page of the electronic book.

The edge color value can effectively reflect a color component of the current image page of the electronic book. For example, for a cover of the electronic book or a page of the electronic book in which illustrations are provided in one or more boundary regions, the edge color may include multiple colors. For another example, in a case that main content of the current page of the electronic book is words but a picture background or a decorative background with a different color is used, the edge color may also include multiple colors. Colors of the edge are extracted, and the extracted colors are combined with page content of the image page of the electronic book (such as images or words) to serve as a basis for a folded portion of the image page of the electronic book displayed during a page turning process, thereby improving processing efficiency of color. In addition, a matching degree with the currently displayed image page of the electronic book is high, therefore color matching is more harmonious, thereby effectively improving a display effect of the page of the electronic book, particularly the image page of the electronic book.

The page content of the currently displayed page of the electronic book may be acquired by those skilled in the art by any appropriate manner according to actual conditions. For example, information on the drawn page content is acquired when the page of the electronic book is drawn, or, a drawings region of the page of the electronic book is determined, and then the drawn content is acquired from the region, which is not limited in the embodiment of the present disclosure.

In addition, the page turning operation for the currently displayed page of the electronic book being received may be determined by those skilled in the art by an appropriate manner as required. For example, in a case that it is detected that a user performs an operation on the currently displayed page of the electronic book by a touch screen and the operation is determined as a sliding operation according to its trajectory coordinates, it is considered that the user performs a page turning operation on the currently displayed page of the electronic book, or, the operation is determined as the sliding operation according to an operation trajectory of a mouse, it is considered that the page turning operation on the page of the electronic book is performed, which is not limited in the embodiment of the present disclosure.

In addition, unless specifically illustrated, in the embodiment of the present disclosure, the currently displayed page of the electronic book indicates a page which has been read and is to be turned.

In step S104, a folded portion is drawn and displayed with the edge color value and the page content wherein the folded portion is a back portion of the turned currently displayed image page on which the page turning operation is performed.

A display interface of the electronic book during the page turning process generally includes a first region, a second region and a third region. The third region indicates a region corresponding to the folded portion of the image page of the electronic book on which the page turning operation is performed, the first region indicates a region not shielded by the folded portion in the currently displayed image page of the electronic book, and the second region indicates a region to be displayed in a next page of the currently displayed image page of the electronic book.

Figure 2:
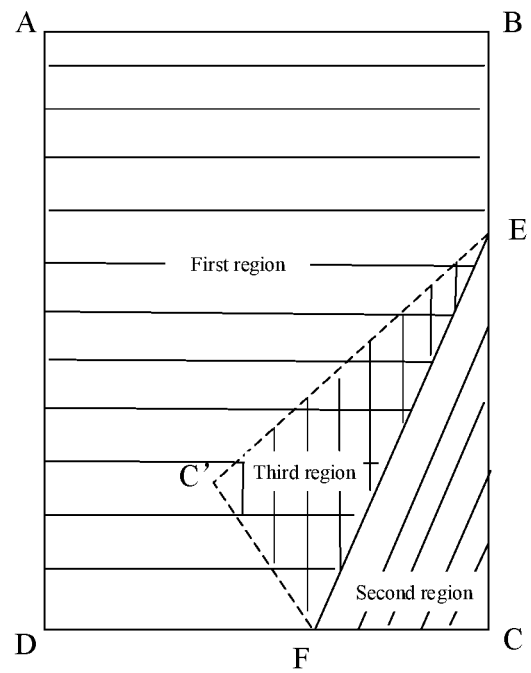
FIG. 2 is a schematic diagram showing region dividing of an electronic book page displayed during a page turning process in accordance with an embodiment of the present disclosure.

FIG. 2 shows a page of the electronic book displayed during a page turning operation process. For facilitate distinguishing, in the embodiment of the present disclosure, a first electronic book page indicates the currently displayed image page of the electronic book (that is, the page which has been read and is to be turned), and a second electronic book page indicates an electronic book page to be displayed (a page to be read and to be displayed after the page turning operation, which may be an image page or a non-image page). In FIG. 2, four outer side lines AB, BC, CD and DA represent boundaries of the page of the electronic book, and A, B, C and D represent four vertices of the page. The displaying of the effect of the electronic book page during the page turning operation may be started from any of the four vertices, for example, starting from the vertex C in FIG. 2. EF represents a folding edge formed by the page turning operation, E represents an intersection point of the folding edge and the page boundary BC, and F represents an intersection point of the folding edge and the page boundary CD. The folding edge EF makes the electronic book page be divided into a region where a page turning initial operation point is located and a region where a current operation point is located, and the two regions forms the whole page of the electronic book. The region where the initial operation point is located is the second region (an oblique line region shown in FIG. 2). An axisymmetric region of the second region relative to the folding edge EF, that is a region EC'F (C' represents a position of the vertex C after the first region turns page along the folding edge EF) is the third region (a region indicated by vertical lines intersecting with horizontal lines in FIG. 2). The region other than the first region and the second region is the first region (a region other than the third region in the region where the current operation point is located, which is indicated by horizontal lines in FIG. 2).

In the embodiment of the present disclosure, the third region is drawn with the edge color value and the page content. The edge color value may serve as a sheet color value of the electronic book page in the third region, and corresponding page content is drawn according to a size of the third region and a position of the current page corresponds to the third region. The size of the third region, the position of the third region in the current page of the electronic book, determining of page content to be displayed in the region and reverse processing thereof, and drawing of the first region and the second region may be implemented by those skilled in the art in an appropriate manner, which is not limited in the embodiment of the present disclosure. The drawn first region, second region and third region form a page display effect of the electronic book during the complete page turning operation process.

In addition, it should be noted that, during the page turning operation process, the third region changes with the page turning operation of the user, including but not limited to changes of the size and the shape. The third region changes during page turning operation process and the third region in FIG. 2 is only schematic. Actually, the third region may be rectangular or trapezoidal. In addition, taking the vertex C being the page turning vertex as an example, as the user performs a sliding operation from right to left, the third region increases gradually, and the drawn page content also increases gradually.

With the method for displaying a page of the electronic book according to the embodiment, when the user performs a page turning operation on the page of the electronic book particularly the image page of the electronic book which is being read, a device where the electronic book reading application is installed, firstly acquires, after receiving the page turning operation, the sheet color and the page content of the edge of the currently displayed image page of the electronic book, and thus draws the folded portion of the edge of the image page of the electronic book displayed during the page turning operation process according to the sheet color and the page content. In one aspect, as compared with the conventional method that the folded portion of the image page of the electronic book is displayed with a fixed color, with the method according to the present disclosure, the edge color serves as a part of the colors of the image page of the electronic book, a matching degree with the image page of the electronic book is higher, and color matching is more harmonious, thereby effectively improving the display effect of the image page of the electronic book and improving reading experience of the user. In another aspect, as compared with the conventional method that color data for the whole page is collected and analyzed to analyze the page color, the edge color value can not only reflect the condition of the current image page of the electronic book, but also greatly reduce the data processing amount for collecting and analyzing of the color data, thereby improving the drawing and display efficiency of the electronic book and further improving the reading experience of the user.

The method for displaying a page of the electronic book according to the embodiment may be implemented by any device with the appropriate data processing capability, including but not limited to a mobile terminal, an electronic book reader or a desktop computer.

Second Embodiment

Figure 3:
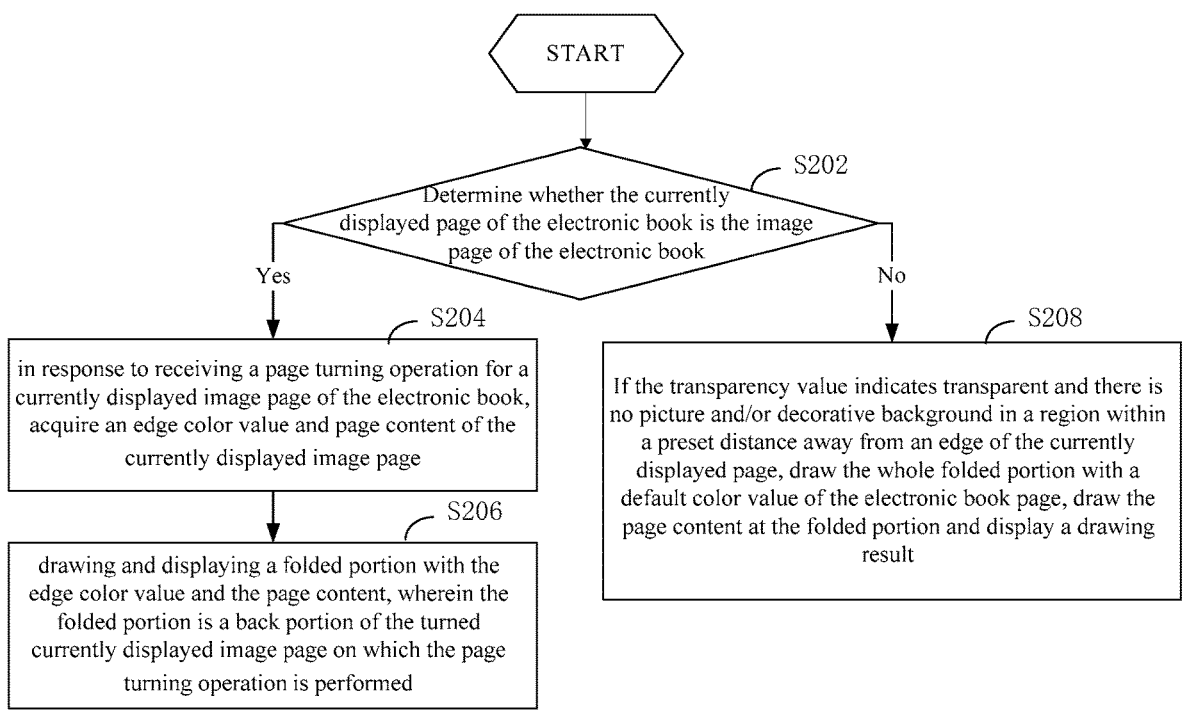
FIG. 3 is a flow chart of steps of a method for displaying a page of an electronic book in accordance with a second embodiment of the present disclosure.

Reference is made to FIG. 3 which shows a flow chart of steps of a method for displaying a page of an electronic book in accordance with a second embodiment of the present disclosure.

The method for displaying a page of the electronic book according to the embodiment includes steps S202 to S208 in the following.

In step S202, it is determined whether a currently displayed page of the electronic book is an image page of the electronic book; if the currently displayed page is the image page of the electronic book, step S204 is performed; and if the currently displayed page is not the image page of the electronic book, step S208 is performed.

The image page is the page of the electronic book contains an image, and the image includes a portion overlapping with a boundary region of the electronic book page, for example, a cover of the electronic book, a content page of the electronic book in which a picture serves as the background or a decorative background is provided, or a page an illustration is provided in the boundary region of a content page of the electronic book.

In an implementation, it is determined whether the currently displayed page is an image page according to a transparency value of the currently displayed page. If the transparency value of the currently displayed page indicates opaque, it can be determined the currently displayed page is the image page. Alternatively, if the transparency value indicates transparent, it is determined whether there is a picture and a decorative background in a region within the preset distance away from the edge of the currently displayed page. If there is the picture and the decorative background, it can be determined that the currently displayed page is the image page.

This is because that, when the electronic book page is to be drawn, typesetting is performed firstly, then a manner for drawing elements to be presented is determined, and then the page is drew by an appropriate manner. The elements to be presented include specific content of the elements to be drawn, such as words, pictures, videos and decorative background, and also include a carrier for drawing the elements to be drawn, such as a canvas. In the embodiment of the present disclosure, the canvas is set to be transparent. If there is a full-screen picture or decorative background in the page of the electronic book, a display result is totally opaque. If there are only words in the page of the electronic book, the display result is that a part of the page is transparent, for example, a boundary region of the words page is transparent. In addition, if the words and pictures are typeset in a mixed manner, for example, words enclose a middle picture or a picture located within a type page is provided between the upper and lower words, the boundary region of the page of the electronic book is still transparent. In a case that the words and pictures are typeset in a mixed manner, the picture is not within the type page and a part of the picture is located in the boundary region of the page, a coverage of the picture is opaque in the boundary region of the page of the electronic book. With the determination manner according to the transparency value, an efficiency for determining whether the page of the electronic book is the image picture of the electronic book is greatly improved. However, the determination manner is not limited, and other manners for determining whether the currently displayed page of the electronic book is the image page of the electronic book may also be adopted. For example, a visual element region is analyzed during the typesetting process of the electronic book page, and it is determined according to image information or decorative background information in the page of the electronic book.

In step S204, in response to receiving a page turning operation for a currently displayed image page of the electronic book, an edge color value and page content of the currently displayed image page are acquired.

The edge color value is a color value at a position within a preset distance away from an edge of the currently displayed image page.

The conventional full graph scanning is replaced with a color value scanning of the edge color, thereby improving an efficiency for color extracting and determination. In addition, the manner coincides with the principle of the book page edge according to the common sense, that is, a paper not printed. Optionally, a region which is one pixel away from the upper, lower, left and right boundaries of the electronic book page is selected as the sheet edge.

In an implementation, a region within the preset distance away from the edge of the image page of the electronic book is determined, and pixel values of pixels in the region are acquired. The edge color value is determined according to the acquired pixel values. Taking an RGB color space as an example, a pixel value of each pixel corresponds to one color. For example, RGB(255, 255, 255) represents white, RGB(0, 0, 0) represents black, and RGB(255, 0, 0) represents red, etc. After the pixel values of pixels in the region are acquired, the corresponding edge color value can be determined according to the pixel values. It should be noted that, the RGB color space is only schematic, and those skilled in the art may select a corresponding color space as required, such as an HSV color space, and HSL color space, which is not limited in the embodiment of the present disclosure.

Since the sheet color may include multiple colors types, the acquired pixel values may indicate multiple colors. In this case, in one implementation, the number of color types contained in the region may be determined according to the acquired pixel values, thereby determining the edge color value. Specifically, it may be determined by using at least one of the following manners. In a first manner, if the number of color types contained in the region is greater than a second preset threshold and less than a third preset threshold, a color corresponding to pixel values which account for a maximum proportion among all the pixel values is determined to be an edge color to be drawn. Both the second preset threshold and the third preset threshold are positive integers, and the second preset threshold is greater than one and less than the third preset threshold. Specific values of the second preset threshold and the third preset threshold may be set appropriately by those skilled in the art, as long as the colors are not too complex. For example, the second preset threshold is set as two, and the third preset threshold is set as five. For another example, the second preset threshold is set as two, and the third preset threshold is set as a integer part of 30% of the number of sampled pixels. For example, if pixel values of 1000 pixels in the region are sampled, 300 pixels have pixel values (255, 255, 255), 200 pixels have pixel values (0, 0, 0), and 500 pixels have pixel values (255, 0, 0), a color corresponding to pixel values which account for a maximum proportion, that is red corresponding to (255, 0, 0), is determined as the edge color to be drawn. In a second manner, if the number of color types contained in the region is greater than or equal to the third preset threshold, a preset color is determined as the edge color to be drawn. The preset color may be set appropriately by those skilled in the art as required, for example, set to be white, light beige or light yellow. In a third manner, if the region contains only one color, the one color may be determined as the edge color.

In a case that the number of color types is within the range from the second preset threshold to the third preset threshold, it is indicated there are only several colors in the currently displayed page of the electronic book, and the page color is relatively clean. In this case, the color corresponding to pixel values which account for a maximum proportion serves as the edge color, which leads to a natural transition and a good color matching effect. In a case that the number of color types is greater than or equal to the third preset threshold, it is indicated that the color of the currently displayed image page of the electronic book is complex, and it is difficult to determine a color with a good matching degree. In addition, mixing colors may cause the user to feel visual fatigue, and the visual fatigue of the user cannot be alleviated by selecting the color corresponding to the pixel values which account for a maximum proportion. Therefore, if the colors of the currently displayed image page of the electronic book are relatively complex, the preset color may be used as the edge color of the image page of the electronic book, so as to bring better reading experience for the user.

In another implementation, a ratio of the number of color types contained in the region to the number of the acquired pixel values may be determined according to the acquired pixel values, thereby determining the edge color. The determining may be performed by using at least one of the following manners. In a first manner, if the ratio is greater than a first preset ratio and less than a second preset ratio, a color corresponding to pixel values which account for a maximum proportion among all the pixel values is determined as the edge color to be drawn. The second preset ratio is greater than the reciprocal of the number of the acquired pixel values. The first preset ratio is less than the second preset ratio. Specific values of the first preset ratio and the second preset ratio may be set appropriately by those skilled in the art according to actual conditions, as long as the colors are not too complex. In a second manner, if the ratio of the number of color types contained in the region to the number of the acquired pixel values is greater than or equal to the second preset ratio, the preset color is determined as the edge color to be drawn. The preset color may be set appropriately by those skilled in the art as required, such as set as white, light beige or light yellow.

In a third manner, if the region contains only one color, the one color is determined as the edge color.

In addition, the "ratio" in the embodiment of the present disclosure also includes a proportion indicated by a percentage.

The page content of the image page of the electronic book includes but not limited to an image or words, and may be acquired by those skilled in the art by appropriate means, which is not limited in the embodiment of the present disclosure.

In step S206, a folded portion is drawn and displayed with the edge color value and the page content wherein the folded portion is a back portion of the turned currently displayed image page on which the page turning operation is performed.

In an implementation, for the folded portion of the image page of the electronic book, the page content may be drawn at the folded portion firstly, and then the whole folded portion may be drawn with the edge color value above the drawn page content. The page content is drawn firstly and then the edge color is drawn, such that a better projection effect is achieved, thereby being more close to a real page turning effect. Other parts of the page of the electronic book, including parts other than the folded portion in the currently displayed page of the electronic book and a display portion of a next page of the currently displayed image page, may be drawn by those skilled in the art by selecting an appropriate manner as required. After these parts are drawn, a final drawing result is displayed.

In an implementation, the transparency value of the drawn color value may be reduced. That is, the whole folded portion is drawn with the edge color value above the drawn page content, the transparency value of the drawn color value is reduced, such that the finally displayed effect is more close to a real page turning effect. In another optional manner, in reducing the transparency value of the edge color value, it may be determined whether brightness value of the drawn color value is less than a first preset threshold. If the brightness value is less than the first preset threshold, the transparency value of the drawn color value is reduced. The first preset threshold may be set appropriately by those skilled in the art as required, such as set to be 0.2. The degree for reducing the transparency value of the edge color value may be set appropriately by those skilled in the art as required, for example set to be half of the original transparency value. In the image page of the electronic book, in a case that the brightness value is less than a certain threshold, the transparency value of the color is higher, resulting in that the drawn page content is displayed relatively clear, and thus not conforming to the real page turning effect and influencing the reading experience of the user. The transparency value of the edge color value in this case is reduced, to improve the reading experience of the user.

In this step, the folded portion of the image page of the electronic book is emphasized. Other parts other than the folded portion may be drawn by those skilled in the art by using any appropriate manner, which is not described in detail here.

In addition, in the embodiment, the image page of the electronic book is drawn by using OpenGL. The OpenGL defines a professional graphic program interface meeting a cross-programming language and cross-platform programming interface specification, and is irrelevant to the hardware. With the OpenGL, a 2D or 3D image may be drawn easily. The present disclosure is not limited to the OpenGL, other manners such as Unity or OpenGL are also adaptable.

In order to make the page turning effect of the electronic book coincide with the actual page turning effect better, in the embodiment, the page turning effect may be drawn by using the OpenGL as well as the constructed cylinder model or a cone model, where a tangent line of the constructed cylinder model or cone model with the page superposes with the folding edge EF. With the cylinder model or the cone model, a page turning effect that the page of the electronic book performs edge curling around an obliquely-placed cylinder model or cone model is achieved. In the following, it is illustrated by taking a cylinder model as an example.

Figure 4:
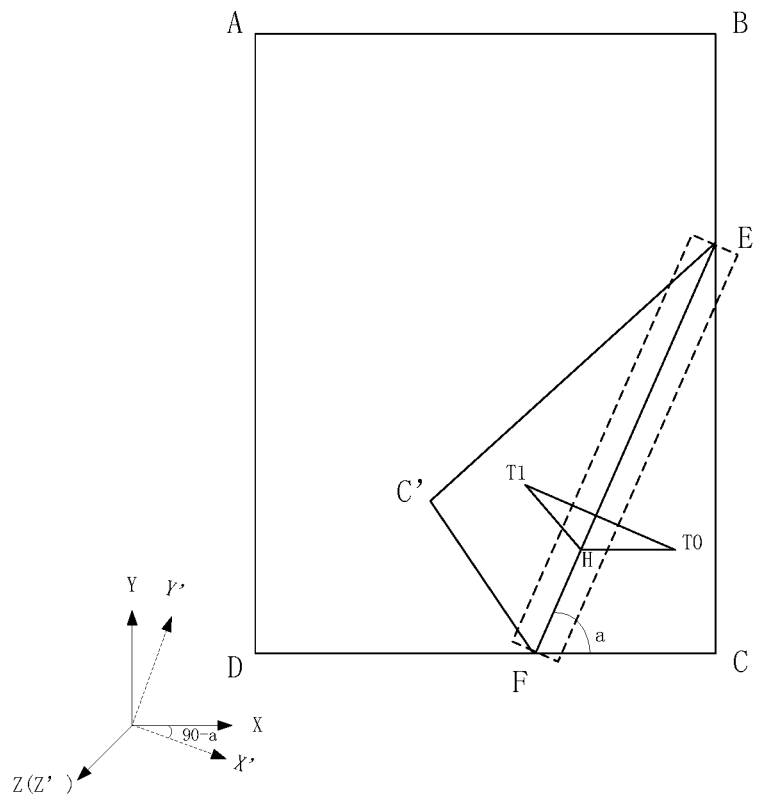
FIG. 4 is a schematic diagram of a cylindrical model used during a page turning effect drawing process in accordance with an embodiment of the present disclosure.

Referring to FIG. 4, in FIG. 4, T0 indicates an initial operation point of the page turning operation, T1 indicates a current operation point of the page turning operation, and the folding edge EF is formed in response to a page turning operation from T0 to T1. According to the interface shown in FIG. 2, an intersection point H of a straight line which is parallel with the boundary CD and passes through the initial operation point T0 and the folding edge EF is defined as a first center point. A first rectangular coordinate system XYZ (shown by a left lower corner of FIG. 4) is established by taking the first center point as an origin, a direction in which the boundary CD extends as a extension direction of the X axis, and a direction in which the boundary DA or BC adjacent to the boundary CD extends as a extension direction of the Y axis. A cylinder model and a page tangent to the cylinder model (to facilitate distinguishing, referred to as the constructed page hereinafter) are constructed in the first rectangular coordinate system XYZ. The constructed page is parallel with the page ABCD. Three-dimensional rotation is performed on the cylinder model and its tangent constructed page, such that a tangent line of the rotated cylinder model (a cross section of the cylinder model is shown by dashed lines in FIG. 4) and the constructed page overlaps with the folding edge EF. Then, page texture corresponding to the third region, after being segmented and rotated, is adhered to the cylinder model.

The page texture corresponding to the third region means texture corresponding to a folded portion of the current image page of the electronic book (including an image and an edge color of the current image page of the electronic book). In the embodiment, the image of the current image page of the electronic book is first drawn on the rotated cylinder model, and then the edge color is drawn on the drawn image. In drawing the image, it is assumed that the image is divided into n×m small square blocks, and each of the small square blocks have four vertices which are texture vertices. Alternatively, it is assumed that the image is divided into multiple triangular blocks, and each of the triangular blocks has three vertices which are texture vertices. It should be understood that, as an area of the divided block decreases and the number of blocks increases (the number of texture vertices also increases), the effect of adhering to the cylinder model is more realistic. The manner for texture segmenting and the number of the divided blocks may be set by those skilled in the art as required, which is not limited in the embodiment of the present disclosure.

In performing texture processing, coordinates of respective texture vertices after being rotated are calculated according to coordinates of texture vertices of image blocks corresponding to the third region in the first rectangular coordinate system and an appropriate three-dimensional rotation equation. Then texture map for the cylinder model is performed according to the rotated coordinates.

In an implementation, according to the coordinates of the texture vertices of the image blocks corresponding to the third region in the first rectangular coordinate system, coordinates of the texture vertices after being rotated from the first rectangular coordinate system to a second rectangular coordinate system X'Y'Z' are calculated. A position of the folding edge EF in the second rectangular coordinate system rotates (90-a) degrees relative to a position of the folding edge EF in the first rectangular coordinate system, where a indicates a current page turning angle.

As shown in FIG. 4, taking the first center point H as a rotation point, the first rectangular coordinate system rotates (90-a) degrees around the Z axis, the second rectangular coordinate system is generated. The origin of the second rectangular coordinate system is still the first center point H, an axis in the second rectangular coordinate system corresponding to the X axis in the first rectangular coordinate system is an X' axis, and an axis in the second rectangular coordinate system corresponding to the Z axis in the first rectangular coordinate system is a Z' axis (overlapping with the Z axis). In the first rectangular coordinate system, the tangent line of the cylinder model and the constructed page overlaps with the folding edge EF. That is, an angle between the cylinder model and the boundary CD is the current page turning angle a. In addition, the second rectangular coordinate system rotates degrees of (90-a) in a clockwise direction around the point H relative to the first rectangular coordinate system. Therefore, the cylinder model overlaps with the Y' axis in the second rectangular coordinate system, that is, the cylinder model is "shifted to be upright" in the second rectangular coordinate system. Similarly, after three-dimensional rotation, the texture vertices are also "shifted to be upright", so as to be drawn on the "shifted" cylinder model.

Similarly, in using a cone model, coordinate converting may be performed for texture vertices of image blocks corresponding to the third region and the cone model, a vertex of the converted cone model may be a vertex of the folding edge, such as the vertex E of the folding edge EF, thereby performing texture map according to coordinates of the converted texture vertices. Coordinate converting may be performed by those skilled in the art by using an appropriate mathematic manner, which is not described in detail here.

The first region and the second region may be drawn by those skilled in the art by using conventional means. For example, for the first region, region range coordinates are determined, then information on all pixel points of images within the coordinate range are acquired, and then an image is drawn according to the information on the pixel points within the coordinate range. For the second region, region range coordinates are determined, then information on all pixel points of images within the coordinate range or information on words within the coordinate range is acquired, and then drawing is performed according to the information on the pixel points or word information in the coordinate range. In the embodiment of the present disclosure, the manner for drawing the first region and the second region is not limited.

In step S208, in a case that the transparency value indicates transparent and there is no picture and decorative background in the region within the preset distance away from the edge of the currently displayed page of the electronic book, the whole folded portion is drawn with a default color value of the electronic book page, then page content of the electronic book page is drawn at the folded portion, and a drawing result is displayed.

That is, in a case that the currently displayed page of the electronic book is not the image page of the electronic book, the whole folded portion is drawn with a default color value of the electronic book page, then page content of the electronic book page is drawn at the folded portion, and a drawing result is displayed. For example, if the currently displayed page of the electronic book is an only word page or a picture and word mixing page in which the picture is located within the type page, the folded portion is drawn with a default color value (such as a sheepskin paper color), and then the page content is drawn on the folded portion, to simulate the actual pate turning effect of such page. Optionally, the transparency value of the drawn page content may be further reduced, to obtain a better simulation effect.

According to the embodiment, the page projection display is achieved during the page turning process of the image page of the electronic book, and effective matching and transition with the currently displayed image page of the electronic book is achieved, thereby improving the display effect of the image page of the electronic book, and improving the reading experience of the user. In addition, processing is performed only with the edge color value, such that the data processing amount for collecting and analyzing of color data is greatly reduced, thereby improving the drawing and display efficiency of the image page of the electronic book, and further improving the reading experience of the user.

The method for displaying a page of the electronic book according to the embodiment may be performed by any appropriate device with the data processing capability, including but not limited to a mobile terminal, an electronic book reader or a desktop computer.

Third Embodiment

Figure 5:
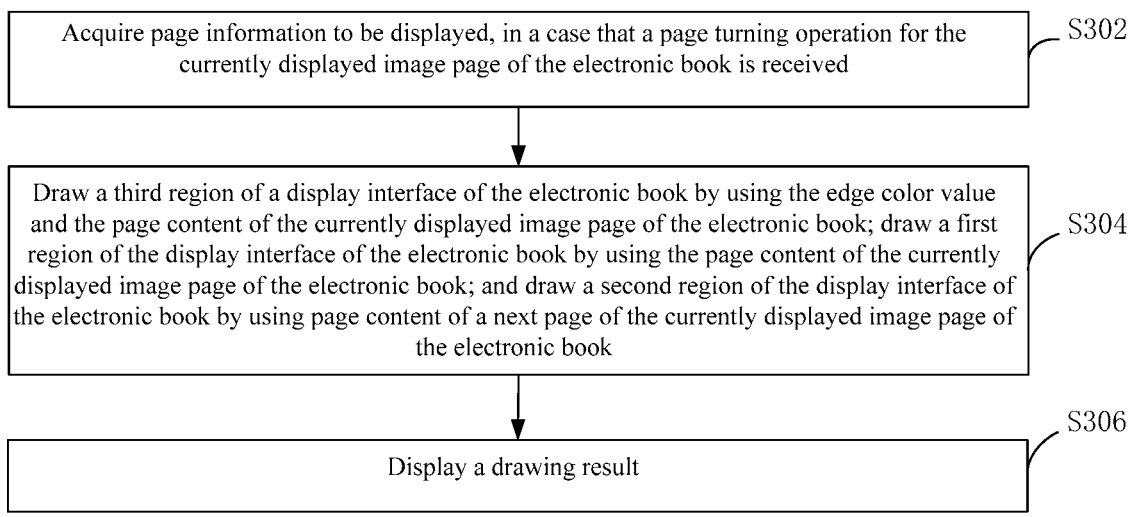
FIG. 5 is a flowchart of steps of a method for displaying a page of an electronic book in accordance with a third embodiment of the present disclosure.

Reference is made to FIG. 5 which shows a flow chart of steps of a method for displaying a page of an electronic book according to a third embodiment of the present disclosure.

The method for displaying a page of the electronic book according to the embodiment includes steps S302 to S306 in the following.

In step S302, page information to be displayed is acquired, in a case that a page turning operation for a currently displayed image page of the electronic book is received.

The page information to be displayed includes: page content and an edge color value of the currently displayed image page of the electronic book, and page content of a next page of the currently displayed page of the electronic book. The edge color value is a color value at a position within a preset distance away from an edge of the currently displayed image page. The preset distance may be set appropriately by those skilled in the art as required, as long as color extraction can be performed in a small region of the boundary of the image page of the electronic book. For example, a region which is one pixel away from four edges of the image page of the electronic book may be set.

In step S304, a third region of the display interface of the electronic book is drawn by using the edge color value and the page content of the currently displayed image page of the electronic book; a first region of the display interface of the electronic book is drawn by using the page content of the currently displayed image page of the electronic book; and a second region of the display interface of the electronic book is drawn by using page content of the next page of the currently displayed image page of the electronic book.

The display interface of the electronic book is divided into the first region, the second region and the third region. The third region indicates a region corresponding to the folded portion of the image page of the electronic book on which the page turning operation is performed. The first region indicates a region not shielded by the folded portion in the currently displayed image page of the electronic book. The second region indicates a region to be displayed in the next page of the currently displayed image page of the electronic book.

In step S306, a drawing result is displayed.

According to the embodiment, when the user performs a page turning operation on the page of the electronic book particularly the image page of the electronic book which is being read, the electronic book reading application draws and displays content at corresponding portions which includes the folded portion and non-folded portion of the image page of the electronic book, and a display portion of a next page of the electronic book. The folded portion of the image page of the electronic book is drawn according to the sheet color of the sheet edge and the page content of the currently displayed image page of the electronic book. In one aspect, as compared with the conventional method that the folded portion of the image page of the electronic book is displayed with a fixed color, with the method according to the present disclosure, the edge color serves as a part of the colors of the image page of the electronic book, a matching degree with the image page of the electronic book is higher, and color matching is more harmonious, thereby effectively improving the display effect of the image page of the electronic book and improving reading experience of the user. In another aspect, as compared with the conventional method that color data for the whole page is collected and analyzed to analyze the page color, the edge color value can not only reflect the condition of the current image page of the electronic book, but also greatly reduce the data processing amount for collecting and analyzing of the color data, thereby improving the drawing and display efficiency of the electronic book and further improving the reading experience of the user.

The method for displaying a page of the electronic book according to the embodiment may be implemented by any appropriate device with the data processing capability, including but not limited to a mobile terminal, an electronic book reader or a desktop computer.

Fourth Embodiment

Figure 6:
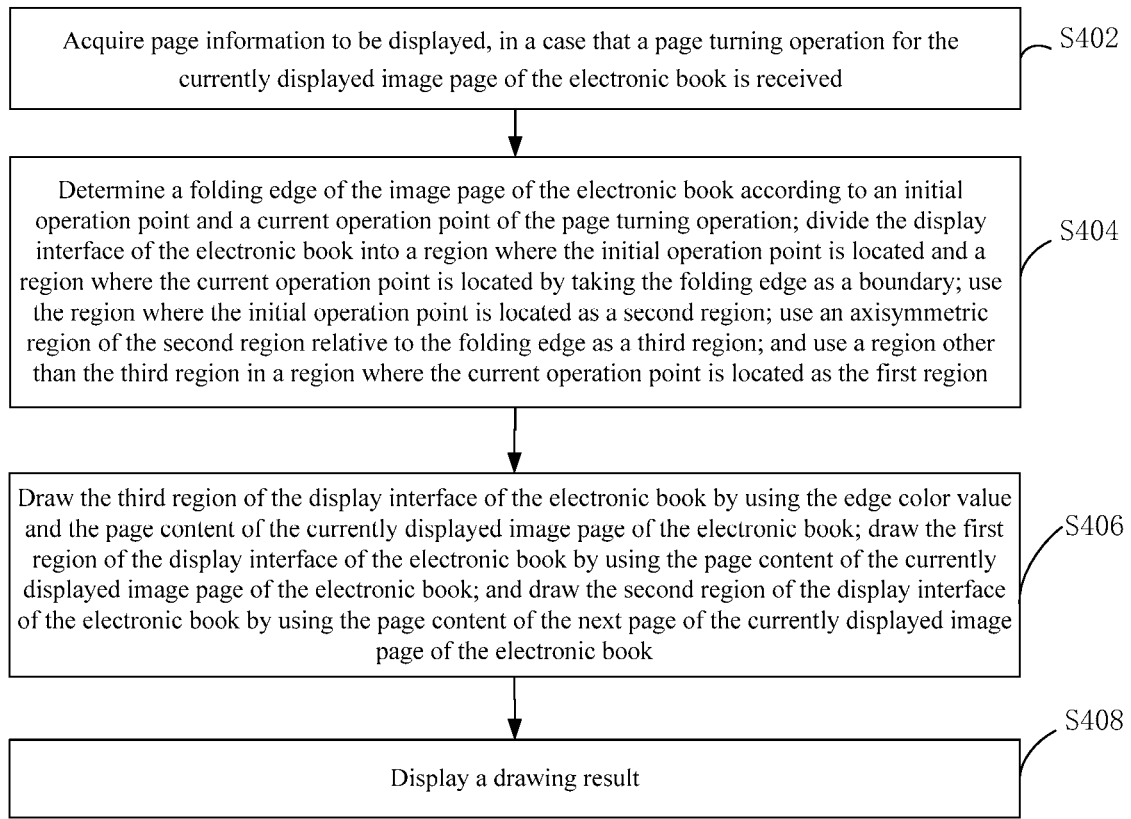
FIG. 6 is a flowchart of steps of a method for displaying a page of an electronic book in accordance with a fourth embodiment of the present disclosure.

Reference is made to FIG. 6 which shows a flow chart of steps of a method for displaying a page of an electronic book according to a fourth embodiment of the present disclosure.

The method for displaying a page of the electronic book according to the embodiment includes steps S402 to S408 in the following.

In step S402, page information to be displayed is acquired, in a case that a page turning operation for a currently displayed image page of the electronic book is received.

The page information to be displayed includes: page content and an edge color value of the currently displayed image page of the electronic book, and page content of a next page of the currently displayed image page of the electronic book. The edge color value is a color value at a position within a preset distance away from an edge of the currently displayed image page.

The edge color value of the currently displayed image page of the electronic book may be acquired in the following manner. Pixel values of pixel in a region within the preset distance away from the edge of the image page of the electronic book are acquired; and information on the edge color value of the currently displayed image page of the electronic book is acquired according to the pixel values. The conventional full graph scanning is replaced with a color value of the sheet edge color, thereby improving an efficiency for color extracting and determination. In addition, the manner coincides with the principle of the book page edge according to the common sense, that is, a paper not printed. Optionally, for the sheet edge, a region which is one pixel away from the upper, lower, left and right boundaries of the electronic book page is selected.

The edge color may include multiple colors, therefore different edge color values may be determined for different conditions. The information on the edge color value of the currently displayed image page of the electronic book may be acquired according to the pixel values by using any one or a combination of the following manners. The manners includes: determining, according to the pixel values, the number of color types contained in a region within the preset distance away from the edge of the image page of the electronic book. In a first case, if the number of color types contained in the region is greater than a second preset threshold and less than a third preset threshold, a color corresponding to pixel values which account for a maximum proportion among all the pixel values is determined as an edge color to be drawn. Both the second preset threshold and the third preset threshold are positive integers, and the second preset threshold is greater than one and less than the third preset threshold. The second preset threshold and the third preset threshold may be set appropriately by those skilled in the art as required. In a second case, if the number of color types contained in the region is greater than or equal to the third preset threshold, a preset color is determined as the edge color to be drawn. The preset color may be set appropriately by those skilled in the art as required. In an implementation, the color is set to be white. In a third case, if the region includes only one color, the one color is determined as the edge color.

In another implementation, a ratio of the number of color types contained in the region to the number of the acquired pixel values may be determined according to the acquired pixel values, thereby determining the edge color value. The determining may be performed by using at least one of the following manners. In a first manner, if the ratio is greater than a first preset ratio and less than a second preset ratio, a color corresponding to pixel values which account for a maximum proportion among all the pixel values is determined as the edge color to be drawn. The second preset ratio is greater than the reciprocal of the number of the acquired pixel values. The first preset ratio is less than the second preset ratio. Specific values of the first preset ratio and the second preset ratio may be set appropriately by those skilled in the art, as long as the colors are not too complex. In a second manner, if the ratio of the number of color types contained in the region to the number of the acquired pixel values is greater than or equal to the second preset ratio, a preset color is determined as the edge color to be drawn. The preset color may be set appropriately by those skilled in the art as required, such as set as white, light beige or light yellow. In a third manner, if the region contains only one color, the one color is determined as the edge color.

In addition, the "ratio" in the embodiment of the present disclosure also includes a proportion indicated by a percentage.

The page content of currently displayed image page of the electronic book and page content of a next page of the currently displayed image page of the electronic book may be acquired by conventional manners.

In step S404, a folding edge of the image page of the electronic book is determined according to an initial operation point and a current operation point of the page turning operation; and taking the folding edge as a boundary, the display interface of the electronic book is divided into a region where the initial operation point is located and a region where the current operation point is located. The region where the initial operation point is located is the second region. An axisymmetric region of the second region relative to the folding edge is the third region. A region other than the third region in the region where the current operation point is located is the first region.

In the display interface of the electronic book during the page turning process, different content is displayed in different regions. Therefore, the display interface is to be divided to draw and display corresponding content. According to the above description, the third region indicates a region corresponding to the folded portion of the image page of the electronic book on which the page turning operation is performed, the first region indicates a region not shielded by the folded portion in the currently displayed image page of the electronic book, and the second region indicates a region to be displayed in the next page of the currently displayed image page of the electronic book. Specifically, please refer to the first, second and third region of the display interface of the electronic book shown in FIG. 2.

In step S406, the third region of the display interface of the electronic book is drawn by using the edge color value and the page content of the currently displayed image page of the electronic book; the first region of the display region of the electronic book is drawn by using the page content of the currently displayed image page of the electronic book; and the second region of the display interface of the electronic book is drawn by using page content of the next page of the currently displayed image page of the electronic book.

The page content corresponding to the third region among the page content of the currently displayed image page of the electronic book is drawn in the third region; and the third region is drew with the edge color value above the drawn page content.

In an implementation, after the third region is drew with the edge color value on the drawn page content, the transparency value of the drawn color value may be reduced.

In step S408, a drawing result is displayed.

In the embodiment, content same or similar to that in the first or second embodiment is described simply. For the detailed content, please refer to corresponding parts of the first or second embodiment, which are not described in detail here.

According to the embodiment, when the user performs a page turning operation on the page of the electronic book particularly the image page of the electronic book which is being read, the electronic book reading application draws and displays content at the folded portion and non-folded portion of the image page, and a display portion of a next page of the electronic book. The folded portion of the image page of the electronic book is drawn according to the edge color value and page content of the currently displayed image page of the electronic book. In one aspect, as compared with the conventional method that the folded portion of the image page of the electronic book is displayed with a fixed color, with the method according to the present disclosure, the edge color serves as a part of the colors of the image page of the electronic book, a matching degree with the image page of the electronic book is higher, and color matching is more harmonious, thereby effectively improving the display effect of the image page of the electronic book and improving reading experience of the user. In another aspect, as compared with the conventional method that color data for the whole page is collected and analyzed to analyze the page color, the edge color value can not only reflect the condition of the current image page of the electronic book, but also greatly reduce the data processing amount for collecting and analyzing of the color data, thereby improving the drawing and display efficiency of the electronic book and further improving the reading experience of the user.

The method for displaying a page of the electronic book according to the embodiment may be implemented by any appropriate device with the data processing capability, including but not limited to a mobile terminal, an electronic book reader or a desktop computer.

Fifth Embodiment

Figure 7:
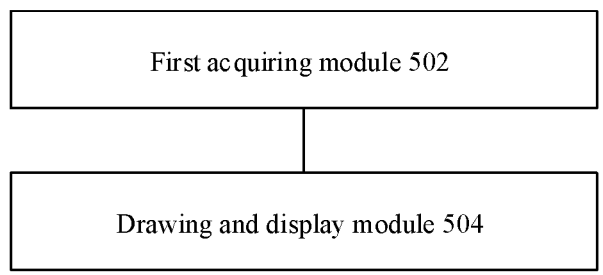
FIG. 7 is a structural block diagram of a device for displaying a page of an electronic book in accordance with a fifth embodiment of the present disclosure.

Reference is made to FIG. 7 which shows a structural block diagram of a device for displaying a page of an electronic book according to a fifth embodiment of the present disclosure.

The device for displaying a page of the electronic book according to the embodiment includes: a first acquiring module 502 and a drawing and display module 504. The first acquiring module 502 is configured to acquire an edge color value and page content of a currently displayed image page of the electronic book, in response to receiving a page turning operation for the currently displayed image page. The edge color value is a color value at a position within a preset distance away from an edge of the currently displayed image page. The drawing and display module 504 is configured to draw and display a folded portion with the edge color value and the page content, wherein the folded portion is a back portion of the turned currently displayed image page on which the page turning operation is performed.

The device according to the embodiment is configured to implement the method for displaying a page of the electronic book according to the first embodiment or the second embodiment, and can achieve the same beneficial effect as the method embodiments, which is not described in detail here.

Sixth Embodiment

Figure 8:
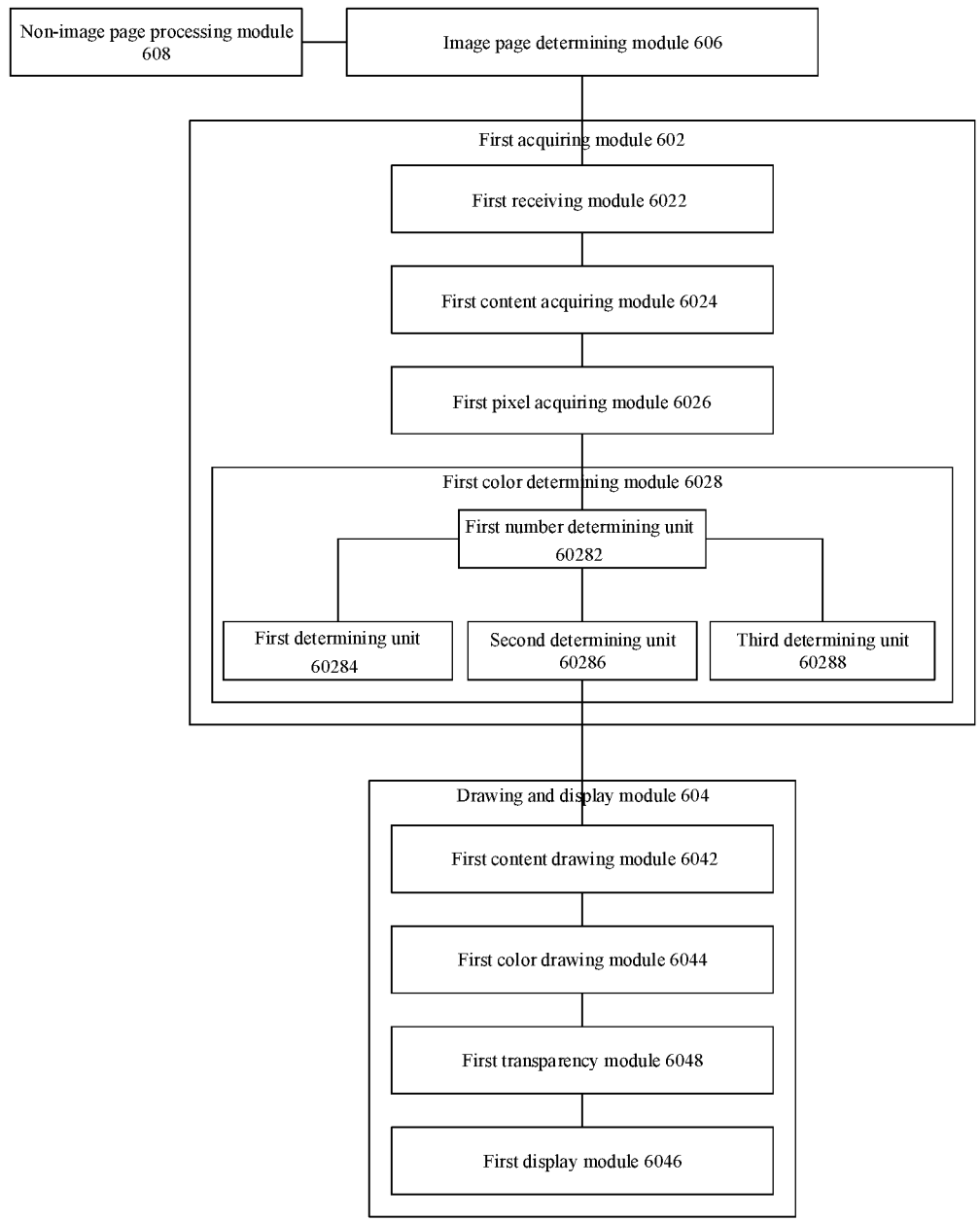
FIG. 8 is a structural block diagram of a device for displaying a page of an electronic book in accordance with a sixth embodiment of the present disclosure.

Reference is made to FIG. 8 which shows a structural block diagram of a device for displaying a page of an electronic book according to a sixth embodiment of the present disclosure.

The device for displaying a page of the electronic book according to the embodiment includes a first acquiring module 602 and a drawing and display module 604. The first acquiring module 602 is configured to acquire an edge color value and page content of a currently displayed image page of the electronic book, in response to receiving a page turning operation for the currently displayed image page. The edge color value is a color value at a position within a preset distance away from an edge of the currently displayed image page. The drawing and display module 604 is configured to draw and display a folded portion with the edge color value and the page content, wherein the folded portion is a back portion of the turned currently displayed image page on which the page turning operation is performed.

Optionally, the drawing and display module 604 includes: a first content drawing module 6042 configured to draw page content at the folded portion of the image page of the electronic book; a first color drawing module 6044 configured to draw the folded portion with the edge color value above the drawn page content; and a first display module 6046 configured to display a drawing result.

Optionally, the drawing and display module 604 further includes: a first transparency module 6048 configured to reduce transparency value of the drawn color value before the first display module 6046 displays the drawing result.

Optionally, the first transparency module 6048 is configured to determine whether brightness value of the drawn color value is less than a first preset threshold; and reduce the transparency value of the drawn color value if the brightness value is less than the first preset threshold.

Optionally, the first acquiring module 602 includes: a first receiving module 6022 configured to determine that a page turning operation on the currently displayed image page of the electronic book is received; a first content acquiring module 6024 configured to acquire page content of the image page of the electronic book; a first pixel acquiring module 6026 configured to determine a region within the preset distance away from the edge of the image page of the electronic book and acquire pixel values of pixels in the region; and a first color determining module 6028 configured to determine the edge color value according to the acquired pixel values.

Optionally, the first color determining module 6028 includes a first number determining unit 60282 and a first determining unit 60284. The first number determining unit 60282 is configured to determine the number of color types contained in the region according to the acquired pixel values. The first determining unit 60284 is configured to determine a color corresponding to pixel values which account for a maximum proportion among all the pixel values as an edge color to be drawn, if the number of color types contained in the region is greater than a second preset threshold and less than a third preset threshold. Both the second preset threshold and the third preset threshold are positive integers, and the second preset threshold is greater than one and less than the third preset threshold. Alternatively, the first color determining module 6028 includes a first number determining unit 60282 and a first determining unit 60284. The first number determining unit 60282 is configured to determine, according to the acquired pixel values, a ratio of the number of color types contained in the region to the number of the acquired pixel values. The first determining unit 60284 is configured to determine a color corresponding to pixel values which account for a maximum proportion among all the pixel values as the edge color to be drawn, if the ratio is greater than a first preset ratio and less than a second preset ratio. The second preset ratio is greater than the reciprocal of the number of the acquired pixel values, and the first preset ratio is less than the second preset ratio.

Optionally, the first color determining module 6028 further includes: a second determining unit 60286 configured to use the preset color as the edge color to be drawn, if the number of the colors contained in the region is greater than or equal to a third preset threshold. Alternatively, the second determining unit 60286 is configured to use the preset color as the edge color to be drawn, if the ratio of the number of color types contained in the region to the number of the acquired pixel values is greater than or equal to the second preset ratio.

Optionally, the first color determining module 6028 further includes: a third determining unit 60288 configured to determine, if the region contains only one color, the one color as the edge color.

Optionally, the device for displaying a page of the electronic book according to the present disclosure further includes an image page determining module 606 configured to: determine whether the currently displayed page of the electronic book is the image page of the electronic book according to the transparency value of the currently displayed page of the electronic book, before the first acquiring module 602 determines that a page turning operation for the currently displayed image page of the electronic book is received; and determine that the currently displayed page of the electronic book is the image page of the electronic book if the transparency value indicates opaque.

Optionally, the image page determining module 606 is further configured to determine, if the transparency value indicates transparent, whether there is a picture and decorative background in a region within the preset distance away from an edge of the electronic book page; and determine that the currently displayed page of the electronic book is the image page of the electronic book, if there is the picture and decorative background in the region.

Optionally, the device for displaying a page of the electronic book according to the embodiment further includes a non-image page processing module 608 configured to: in a case that the transparency value indicates transparent and there is no picture and decorative background in a region within the preset distance away from the edge of the currently displayed page of the electronic book, draw the whole folded portion with a default color value of the electronic book, then draw the page content of the electronic book page at the folded portion, and then display a drawing result.

Optionally, the non-image page processing module 608 is further reduce the transparency value of the page content after drawing the page content of the electronic book page at the folded portion and display the drawing result.

The device for displaying a page of the electronic book according to the embodiment is configured to implement the method for displaying a page of the electronic book according to the first embodiment or the second embodiment, and can achieve the corresponding beneficial effect of the method embodiment, which is not described in detail here.

Seventh Embodiment

Figure 9:
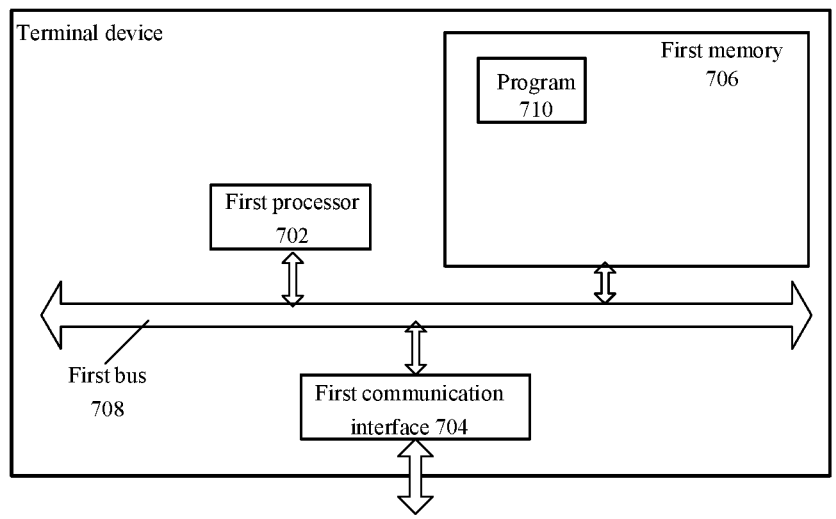
FIG. 9 is a schematic structural diagram of a terminal device in accordance with a seventh embodiment of the present disclosure.

Reference is made to FIG. 9 which shows a schematic structural diagram of a terminal device according to a seventh embodiment of the present disclosure. An implementation of the terminal device is not limited in the embodiment of the present disclosure.

As shown in FIG. 9, the terminal device may include: a first processor 702, a first communication interface 704, a first memory 706 and a first communication bus 708.

The first processor 702, the first communication interface 704 and the first memory 706 communicate with each other via the first communication bus 708.

The first communication interface 704 is configured to perform network element communication with other devices, such as a terminal device or a server.

The first processor 702 is configured to perform programs 710, specifically, perform steps of the method for displaying a page of the electronic book in the above embodiments.

The programs 710 may include program codes. The program codes include computer operation instructions.

The first processor 702 may be a central processing unit (CPU), an application specific integrated circuit (ASIC), or one or more ASICs configured to implement the embodiments of the present disclosure. The one or more processors included in the terminal device may be processors of the same type, such as one or more CPUs. Alternatively, the one or more processor may be processors of different types, such as one or more CPUs and one or more ASICs.

The first memory 706 is configured to store programs 710 and data related to the electronic book page. The first memory 706 may include a high speed RAM memory, or may include a non-volatile memory such as at least one magnetic disc memory.

The programs 710 may be run to cause the first processor 702 to perform the following operations: in response to receiving a page turning operation for a currently displayed image page of the electronic book, acquiring an edge color value and page content of the currently displayed image page, wherein the edge color value is a color value at a position within a preset distance away from an edge of the currently displayed image page; and drawing and displaying a folded portion with the edge color value and the page content, wherein the folded portion is a back portion of the turned currently displayed image page on which the page turning operation is performed.

In an optional implementation, the programs 710 are run to cause the first processor 702 to: draw and display a folded portion of the image page of the electronic book on which the page turning operation is performed by using the edge color value and the page content; draw the page content at the folded portion of the image page of the electronic book; and draw the whole folded portion with the edge color value above the drawn page content; and display a drawing result.

In an optional implementation, the programs 710 are run to cause the first processor 702 to: reduce the transparency value of the drawn color value; determine whether brightness value of the drawn color value is less than a first preset threshold; and reduce the transparency value of the drawn color value if the brightness value is less than the first preset threshold.

In an optional implementation, the programs 710 are run to cause the first processor 702 to: determine a region within the preset distance away from the edge of the image page of the electronic book when acquiring the edge color value of the image page of the electronic book; acquire pixel values of pixels in the region; and determine the edge color value according to the acquired pixel values.

In an optional implementation, the programs 710 are run to cause the first processor 702 to determine the number of color types contained in the region according to the acquired pixel values when determining the edge color value according to the acquired pixel values; determine a color corresponding to pixel values which account for a maximum proportion among all the pixel values as an edge color to be drawn, if the number of color types contained in the region is greater than a second preset threshold and less than a third preset threshold, where both the second preset threshold and the third preset threshold are positive integers, and the second preset threshold is greater than one and less than the third preset threshold; or determine a ratio of the number of color types contained in the region to the number of acquired pixel values according to the acquired pixel values; and determine a color corresponding to pixel values which account for a maximum proportion as the edge color to be drawn, if the ratio is greater than the first preset ratio and less than the second preset ratio. The second preset ratio is greater than the reciprocal of the number of the acquired pixel values, and the first preset ratio is less than the second preset ratio.

In an optional implementation, the programs 710 are run to cause the first processor 702 to use the preset color as the edge color to be drawn, if the number of color types contained in the region is greater than or equal to the third preset threshold; or use the preset color as the edge color to be drawn, if a ratio of the number of color types contained in the region to the number of acquired pixel values is greater than or equal to the second preset ratio.

In an optional implementation, the programs 710 are run to cause the first processor 702 to determine, if the region contains only one color, the one color as the edge color.

In an optional implementation, the programs 710 are run to cause the first processor 702 to determine whether the currently displayed page of the electronic book is the image page of the electronic book according to the transparency value of the currently displayed page of the electronic book, before determining that a page turning operation for the currently displayed image page of the electronic book is received; and determine the currently displayed page of the electronic book is the image page of the electronic book if the transparency value indicates opaque.

In an optional implementation, the programs 710 are run to cause the first processor 702 to determine whether there is a picture and decorative background in a region within the preset distance away from the edge of the currently displayed page of the electronic book, if the transparency value indicates transparent; and determine that the currently displayed page of the electronic book is the image page of the electronic book, if there is a picture and decorative background in the region.

In an optional implementation, the programs 710 are run to cause the first processor 702 to, in case that the transparency value indicates transparent and there is no picture and/or decorative background in a region within the preset distance away from the edge of the currently displayed page of the electronic book, drawn the whole folded portion with a default color value of the page of the electronic book, draw the page content of the electronic book page at the folded portion, and display a drawing result.

In an optional implementation, the programs 710 are run to cause the first processor 702 to reduce the transparency value of the page content after drawing the page content of the electronic book page at the folded portion and before displaying the drawing result.

For specific implementation of steps in the programs 710, one may refer to corresponding description of steps and units in the embodiment of the method for displaying a page of the electronic book, which are not described in detail here.

With the terminal device according to the embodiment, in one aspect, the display effect for the electronic book page is effectively improved, thereby improving the reading experience of the user. In another aspect, the data processing amount for collecting and analyzing of color data is greatly reduced, thereby improving the drawing and display efficiency for the electronic book and further improving the reading experience of the user.

Eighth Embodiment

Figure 10:
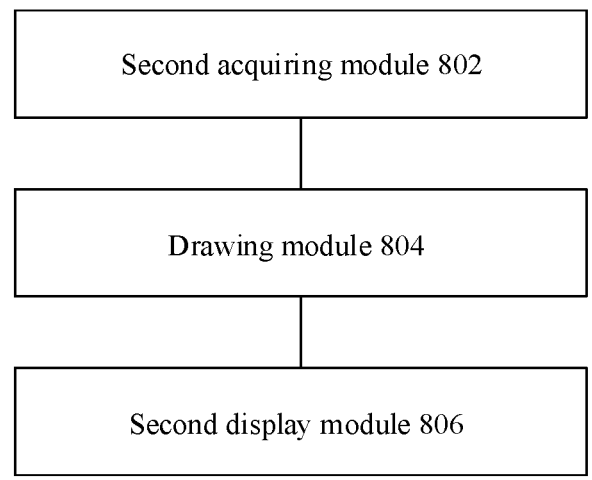
FIG. 10 is a structural block diagram of a device for displaying a page of an electronic book in accordance with an eighth embodiment of the present disclosure.

Reference is made to FIG. 10 which shows a structural block diagram of a device for displaying a page of an electronic book according to an eighth embodiment of the present disclosure.

The device for displaying a page of the electronic book according to the embodiment includes: a second acquiring module 802, a drawing module 804 and a second display module 806. The second acquiring module 802 is configured to acquire page information to be displayed, in a case that a page turning operation for a currently displayed image page of the electronic book is received. The page information to be displayed includes: page content and an edge color value of the currently displayed image page of the electronic book, and page content of a next page of the currently displayed image page of the electronic book. The edge color value is a color value at a position within a preset distance away from an edge of the currently displayed image page. The drawing module 804 is configured to draw a third region of a display interface of the electronic book by using the edge color value and page content of the currently displayed image page of the electronic book; and draw a second region of the display interface of the electronic book by using page content of a next page of the currently displayed image page of the electronic book. The second display module 806 is configured to display a drawing result. The third region indicates a region corresponding to a folded portion of the image page of the electronic book on which the page turning operation is performed, the first region indicate a region not shielded by the folded portion in the currently displayed image page of the electronic book, and the second region indicates a region to be displayed in the next page of the currently displayed image page of the electronic book.

The device for displaying a page of the electronic book according to the embodiment is configured to implement the method for displaying a page of the electronic book according to the third or fourth embodiment, and can achieve the corresponding beneficial effects of the method embodiments, which is not described in detail here.

Ninth Embodiment

Figure 11:
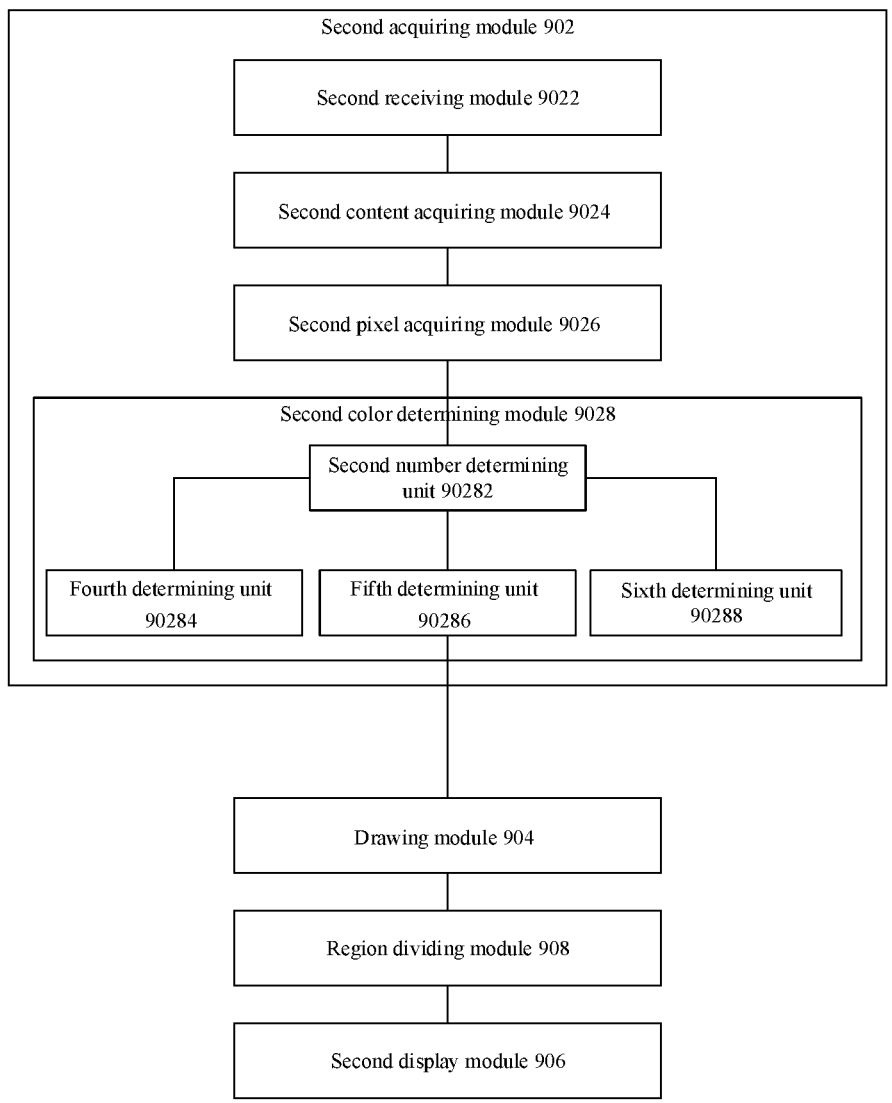
FIG. 11 is a structural block diagram of a device for displaying a page of an electronic book in accordance with a ninth embodiment of the present disclosure.

Reference is made to FIG. 11 which shows a structural bock diagram of a device for displaying a page of an electronic book according to a ninth embodiment of the present disclosure.

The device for displaying a page of the electronic book according to the embodiment includes a second acquiring module 902, a drawing module 904 and a second display module 906.

The second acquiring module 902 is configured to acquire page information to be displayed in a case that a page turning operation for a currently displayed image page of the electronic book. The page information to be displayed includes: page content and an edge color value of the currently displayed image page of the electronic book, and page content of a next page of the currently displayed image page of the electronic book. The edge color value is a color value at a position within a preset distance away from an edge of the currently displayed image page. The drawing module 904 is configured to draw a third region of a display interface of the electronic book by using the edge color value and page content of the currently displayed image page of the electronic book; draw a first region of the display interface of the electronic book by using the page content of the currently displayed image page of the electronic book; and draw a second region of the display interface of the electronic book by using the page content of a next page of the currently displayed image page of the electronic book. The second display module 906 is configured to display a drawing result. The third region indicates a region corresponding to a folded portion of the image page of the electronic book on which the page turning operation is performed, the first region indicates a region not shielded by the folded portion in the currently displayed image page of the electronic book, and the second region indicates a region to be displayed in a next page of the currently displayed image page of the electronic book.

Optionally, for drawing the third region of the display interface of the electronic book by using the edge color value and the page content of the currently displayed image page of the electronic book, the drawing module 904 is configured to: drawn, in the third region, page content corresponding to third region among the page content of the currently displayed image page of the electronic book; and draw the third region with the edge color value above the drawn page content.

Optionally, the drawing module 904 is further configured to reduce the transparency value of the drawn color value, after drawing the third region with the edge color value above the drawn page content.

Optionally, The second acquiring module 902 includes: a second receiving module 9022 configured to receive a page turning operation for a currently displayed image page of the electronic book; a second content acquiring module 9024 configured to page content of the currently displayed image page of the electronic book and page content of a next page of the currently displayed image page of the electronic book, from page information to be displayed; a second pixel acquiring module 9026 configured to acquire pixel values of pixels in a region within the preset distance away from an edge of the image page of the electronic book; and a second color determining module 9028 configured to acquire information on the edge color value of the currently displayed image page of the electronic book according to the pixel values.

Optionally, the second color determining module 9028 includes a second number determining unit 90282 and a fourth determining unit 90284. The second number determining unit 90282 is configured to determine the number of color types contained in the region according to the pixel values. The fourth determining unit 90284 is configured to determine a color corresponding to pixel values which account for a maximum proportion among all the pixel values as an edge color to be drawn, if the number of color types contained in the region is greater than a second preset threshold and less than a third preset threshold. Both the second preset threshold and the third preset threshold are positive integers, and the second preset threshold is greater than 1 and less than the third preset threshold. Alternatively, the second number determining unit 90282 is configured to determine a ratio of the number of color types contained in the region to the number of the acquired pixel values according to the acquired pixel values. The fourth determining unit 90284 is configured to determine a color corresponding to pixel values which account for a maximum proportion among all the pixel values as the edge color to be drawn, if the ratio is greater than a first preset ratio and less than a second preset ratio. The second preset ratio is greater than the reciprocal of the number of the acquired pixel values, and the first preset ratio is less than the second preset ratio.

Optionally, the second color determining module 9028 further includes a fifth determining unit 90286. The fifth determining unit 90286 is configured to use the preset color as the edge color to be drawn, if the number of color types contained in the region is greater than or equal to the third preset threshold. Alternatively, the fifth determining unit 90286 is configured to use the preset color as the edge color to be drawn, if the ratio of the number of color types contained in the region to the number of the acquired pixel values is greater than or equal to the second preset ratio.

Optionally, the second color determining module 9028 further includes a sixth determining unit 90288 configured to determine, if the region contains only one color, the one color as the edge color.

Optionally, the device for displaying a page of the electronic book according to the embodiment further includes a region dividing module 908 configured to: determine a folding edge of the image page of the electronic book according to an initial operation point and a current operation point of the page turning operation, before the drawing module 904 draws the third region of the display interface of the electronic book by using the edge color value and the page content of the currently displayed image page of the electronic book; divide the display interface into a region where the initial operation point is located and a region where the current operation point is located by taking the folding edge as a boundary; use the region where the initial operation point is located as the second region; use an axisymmetric region of the second region relative to the folding edge as the third region; and use a region other than the third region in the region where the current operation point is located, as the first region.

The device for displaying a page of the electronic book according to the embodiment is configured to implement the method according to the third or the fourth method embodiment, and can achieve the corresponding beneficial effect of the method embodiment, which is not described in detail here.

Tenth Embodiment

Figure 12:
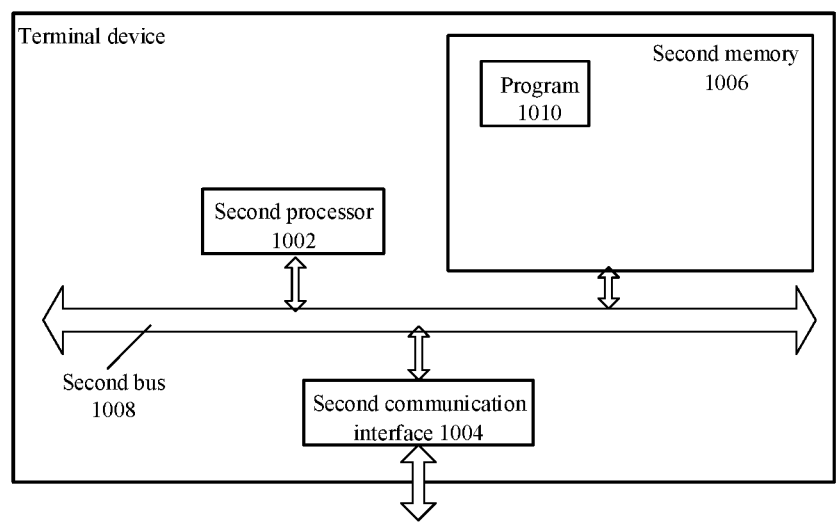
FIG. 12 is a schematic structural diagram of a terminal device in accordance with a tenth embodiment of the present disclosure.

Reference is made to FIG. 12 which shows a schematic structural diagram of a terminal device according to a tenth embodiment of the present disclosure. Specific implementation of the terminal device is not limited in the embodiment of the present disclosure.

As shown in FIG. 12, the terminal device may include: a second processor 1002, a second communication interface 1004, a second memory 1006 and a second communication bus 1008.

The second processor 1002, the second communication interface 1004 and the second memory 1006 communicate with each other via the second communication bus 1008.

The second communication interface 1004 is configured to perform network element communication with other devices, such as a terminal device or a server.

The second processor 1002 is configured to perform programs 1010, specifically, perform steps of the method for displaying a page of the electronic book in the above embodiments.

The programs 1010 may include program codes. The program codes include computer operation instructions.

The second processor 1002 may be a central processing unit (CPU), an application specific integrated circuit (ASIC), or one or more ASICs configured to implement the embodiments of the present disclosure. The one or more processors included in the terminal device may be processors of the same type, such as one or more CPUs. Alternatively, the one or more processor may be processors of different types, such as one or more CPUs and one or more ASICs.

The second memory 1006 is configured to store programs 1010 and data related to the electronic book page. The second memory 1006 may include a high speed RAM memory, or may include a non-volatile memory such as at least one magnetic disc memory.

The programs 1010 may be run to cause the second processor 1002 to perform the following operations: acquiring, in a case that it is determined that a page turning operation for a currently displayed image page of the electronic book is received, page information to be displayed, where the page information to be displayed includes page content and an edge color value of the currently displayed image page of the electronic book, and page content of a next page of the currently displayed image page of the electronic book, the edge color value is a color value at a position within a preset distance away from an edge of the currently displayed image page; draw a third region of a display interface of the electronic book by using the edge color value and page content of the currently displayed image page of the electronic book; draw a first region of the display interface of the electronic book by using page content of the currently displayed image page of the electronic book; draw a second region of the display interface of the electronic book by using page content of the next page of the currently displayed image page of the electronic book; and display a drawing result. The third region indicates a region corresponding to the folded portion of the image page of the electronic book on which the page turning operation is performed. The first region indicates a region not shielded by the folded portion in the currently displayed image page of the electronic book. The second region is a region to be displayed in the next page of the currently displayed image page of the electronic book.

In an optional implementation, the programs 1010 are run to cause the second processor 1002, for drawing a third region of the display interface of the electronic book by using the edge color value and page content of the currently displayed image page of the electronic book, to draw, in the third region, page content corresponding to the third region among the page content of the currently displayed image page of the electronic book; and draw the third region with the edge color value above the drawn page content.

In an optional implementation, the programs 1010 are run to cause the second processor 1002 to reduce the transparency value of the drawn color value after drawing the third region with the edge color value above the drawn page content.

In an optional implementation, the programs 1010 are run to cause the second processor 1002, for acquiring the page information to be displayed, to acquire pixel values of pixels in a region within the preset distance away from an edge of the image page of the electronic book; and acquire information on the edge color value of the currently displayed image page of the electronic book according to the pixel values.

In an optional implementation, the programs 1010 are run to cause the second processor 1002, for acquiring the information on the edge color value of the currently displayed image page of the electronic book according to the pixel values, to determine the number of color types contained in the region according to the pixel values; determine a color corresponding to pixel values which account for a maximum proportion among all the pixel values as an edge color to be drawn, if the number of color types contained in the region is greater than a second preset threshold and less than a third preset threshold, where both the second preset threshold and the third preset threshold are positive integers, and the second preset threshold is greater than one and less than the third preset threshold; or determine a ratio of the number of color types contained in the region to the number of the acquired pixel values according to the acquired pixel values; and determine a color corresponding to pixel values which account for a maximum proportion as the edge color to be drawn, if the ratio is greater than the first preset ratio and less than the second preset ratio. The second preset ratio is greater than the reciprocal of the number of the acquired pixel values, and the first preset ratio is less than the second preset ratio.

In an optional implementation, the programs 1010 are run to cause the second processor 1002 to use the preset color as the edge color to be drawn, if the number of color types contained in the region is greater than or equal to the third preset threshold; or use the preset color as the edge color to be drawn, if a ratio of the number of color types contained in the region to the number of acquired pixel values is greater than or equal to the second preset ratio.

In an optional implementation, the programs 1010 are run to cause the second processor 1002 to determine, if the region contains only one color, the one color as the edge color.

In an optional implementation, the programs 1010 are run to cause the second processor 1002 to determine a folding edge of the image page of the electronic book according to an initial operation point and a current operation point of the page turning operation, before drawing the third region of the display interface of the electronic book by using the edge color value and the page content of the currently displayed image page of the electronic book; divide, by taking the folding edge as a boundary, the display interface of the electronic book into a region where the initial operation point is located and a region where the current operation point is located; use the region where initial operation point is located as the second region, use an axisymmetric region of the second region relative to the folding edge as the third region; and use a region other than the third region in the region where the current operation point is located as the first region.

For specific implementation of steps in the programs 1010, one may refer to description of corresponding steps and units in the embodiment of the method for displaying a page of the electronic book, which is not described in detail here. It should be clearly known by those skilled in the art that, for the specific operation process of the device and modules described above, one may refer to description of corresponding process in the previous method embodiments, which is not described in detail here.

With the terminal device according to the embodiment, in one aspect, the display effect for the electronic book page is effectively improved, thereby improving the reading experience of the user. In another aspect, the data processing amount for collecting and analyzing of color data is greatly reduced, thereby improving the drawing and display efficiency for the electronic book and further improving the reading experience of the user.

It should be noted that, as required, components/steps described in the embodiments of the present disclosure may be divided into more components/steps, and two or more components/steps or a part of operations of the components/steps may be combined to form a new component/step, to achieve the object of the embodiment of the present disclosure.

The method according to the embodiment of the present disclosure may be implemented by hardware and firmware, an application or computer codes which can be stored in a recording medium (such as a CD ROM, an RAM, a soft disk, a hard disk or a magnetic-optical disk), or computer codes downloaded over the network which are originally stored in a remote recording medium or a non-temporal machine readable medium and are to be stored in a local recording medium. Therefore, the method described here may be stored on the recording medium of a general-purpose computer, a dedicated processor or programmable dedicated hardware (such as ASIC or FPGA) to perform the application processing. It should be understood that the computer, the processor, a micro-processor-controller or the programmable hardware include storage components which can store or receive applications or computer codes (such as RAM, ROM and flash memory). When the application or computer codes is accessed and executed by the computer, processor or the hardware, the method for displaying a page of the electronic book described here is implemented. In addition, when the general-purpose computer accesses the codes for displaying the electronic book, the codes are executed to convert the general-purpose computer into a dedicated computer for displaying the page of the electronic book.

It should be appreciated by those skilled in the art, units and method steps of examples described according to the embodiments of the present disclosure, can be implemented by electronic hardware or a combination of the computer application and the electronic hardware. Whether the function is performed by hardware or the application depends on specific applications and design constraints of the technical solutions. Those skilled in the art may use different methods to achieve the described functions for each specific application, but such implementation should not be regarded as going beyond the scope of the embodiment of the present disclosure.

The above implementations are only used to illustrate the embodiments of the present disclosure rather than limit the embodiments of the present disclosure. Those skilled in the art may make many changes and variations without departing from the spirit and range of the embodiments of the present disclosure. Therefore, all equivalent technical solutions fall within the scope of the embodiments of the present disclosure, and the protection scope of embodiments of the present disclosure should be defined by the attached claims.

What is claimed is:

1. A method for displaying pages of an electronic book, comprising:
   determining that a currently displayed page of the electronic book is a currently displayed image page of the electronic book based at least in part on a transparency value of the currently displayed page;
   in response to receiving a page turning operation for the currently displayed image page of the electronic book, acquiring an edge color value and page content of the currently displayed image page, wherein the edge color value is a color value at a position within a preset distance away from an edge of the currently displayed image page;
   drawing and displaying a folded portion with the edge color value and the page content, wherein the folded portion is a back portion of the currently displayed image page being turned on which the page turning operation is performed;
   wherein the drawing and displaying a folded portion with the edge color value and the page content further comprises:
      drawing the page content at the folded portion of the currently displayed image page,
      drawing the whole folded portion with a drawn color corresponding to the edge color value above the drawn page content,
      reducing a transparency value of the drawn color when a brightness value of the drawn color is less than a first preset threshold, and
      displaying a drawing result.

2. The method according to claim 1, wherein the acquiring an edge color value of the currently displayed image page comprises:
   determining a region within the preset distance away from the edge of the currently displayed image page;
   acquiring pixel values of the pixels in the region; and
   determining the edge color value according to the acquired pixel values.

3. The method according to claim 2, wherein the determining the edge color value according to the acquired pixel values comprises at least one of the following:
   determining, according to the acquired pixel values, the number of color types contained in the region; determining a color corresponding to the pixel values which account for a maximum proportion among all the pixel values as an edge color to be drawn, if the number of color types contained in the region is greater than a second preset threshold and less than a third preset threshold, wherein both the second preset threshold and the third preset threshold are positive integers, the second preset threshold is greater than one and less than the third preset threshold;
   determining, according to the acquired pixel values, a ratio of the number of color types contained in the region to the number of the acquired pixel values; determining a color corresponding to the pixel values which account for a maximum proportion among all the pixel values as an edge color to be drawn, if the ratio is greater than a first preset ratio and less than a second preset ratio, wherein the second preset ratio is greater than the reciprocal of the number of the acquired pixel values, and the first preset ratio is less than the second preset ratio;
   determining a preset color as the edge color to be drawn if the number of color types contained in the region is greater than or equal to the third preset threshold;
   determining the preset color as the edge color to be drawn if the ratio of the number of color types contained in the region to the number of the acquired pixel values is greater than or equal to the second preset ratio; and
   when there is only one color in the region, determining the color as the edge color.

4. The method according to claim 1, wherein the determining that a currently displayed page of the electronic book is a currently displayed image page of the electronic book based at least in part on a transparency value of the currently displayed page further comprises:
   in response to determining that the transparency value of the currently displayed page indicates opaque, determining a currently displayed page of the electronic book is the currently displayed image page;
   in response to determining that the transparency value of the currently displayed page indicates transparent, determining whether there is at least one of a picture and a decorative background in a region within the preset distance away from the edge of the currently displayed page; and
   determining that the currently displayed page is the currently displayed image page in response to determining that there is at least one of the picture and the decorative background in the region.

5. The method according to claim 4, further comprising:
   drawing the whole folded portion with a default color value of the electronic book page, then drawing the page content at the folded portion and displaying a drawing result, if the transparency value indicates transparent and there is no picture or decorative background in the region within the preset distance away from the edge of the currently displayed page.

6. The method according to claim 5, wherein after the drawing the page content at the folded portion and before the displaying the drawing result, the method further comprises:
   reducing transparency value of the page content.

7. The method according to claim 1, the method further comprises:
   acquiring a page content of a next page of the currently displayed image page;
   wherein the drawing and displaying a folded portion with the edge color value and the page content comprises:
   drawing a third region of a display interface by using the edge color value and the page content of the currently displayed image page; and
   drawing a first region of the display interface of the electronic book by using the page content of the currently displayed image page; and
   drawing a second region of the display interface by using the page content of the next page of the currently displayed image page; and
   displaying a drawing result,
   wherein the third region is a region that display the folded portion; the first region is a region of the currently displayed image page that is not shielded by the folded portion; and the second region is a region to be displayed in the next page.

8. The method according to claim 7, wherein before the drawing and displaying a folded portion with the edge color value and the page content, further comprises:
   determining a folding edge of the currently displayed image page according to an initial operation point and a current operation point of the page turning operation;
   dividing, by taking the folding edge as a boundary, the display interface of the electronic book into a region where the initial operation point is located and a region where the current operation point is located; and using the region where the initial operation point is located as the second region; using an axisymmetric region of the second region relative to the folding edge as the third region; and using a region other than the third region in the region where the current operation point is located, as the first region.

9. A device for displaying pages of an electronic book, comprising:

at least one processor; and at least one memory;

wherein one or more programs are stored in the at least one memory, and when executed by the at least one processor, the one or more programs cause the at least one processor to:

determine that a currently displayed page of the electronic book is a currently displayed image page of the electronic book based at least in part on a transparency value of the currently displayed page;

acquire an edge color value and page content of the currently displayed image page of the electronic book, in response to receiving a page turning operation for the currently displayed image page, wherein the edge color value is a color value at a position within a preset distance away from an edge of the currently displayed image page;

draw and display a folded portion with the edge color value and the page content, wherein the folded portion is a back portion of the currently displayed image page being turned on which the page turning operation is performed;

wherein when executed by the at least one processor, the one or more programs further cause the at least one processor to:

draw the page content at the folded portion of the currently displayed image page, draw the whole folded portion with a drawn color corresponding to the edge color value above the drawn page content, reduce a transparency value of the drawn color when a brightness value of the drawn color is less than a first preset threshold, and display a drawing result.

10. The device according to claim 9, wherein the at least one processor is further caused to:

acquire a page content of a next page of the currently displayed image page;

draw a third region of a display interface by using the edge color value and the page content of the currently displayed image page; and draw a first region of the display interface of the electronic book by using the page content of the currently displayed image page; and draw a second region of the display interface by using the page content of the next page of the currently displayed image page; and display a drawing result, wherein the third region is a region that display the folded portion; the first region is a region of the currently displayed image page that is not shielded by the folded portion; and the second region is a region to be displayed in the next page.

11. The device according to claim 10, wherein the at least one processor is further caused to:

determine a folding edge of the currently displayed image page according to an initial operation point and a current operation point of the page turning operation;

divide, by taking the folding edge as a boundary, the display interface of the electronic book into a region where the initial operation point is located and a region where the current operation point is located; and use the region where the initial operation point is located as the second region; use an axisymmetric region of the second region relative to the folding edge as the third region; and use a region other than the third region in the region where the current operation point is located, as the first region.

12. The device according to claim 9, wherein the at least one processor is further caused to:

determine a region within the preset distance away from the edge of the currently displayed image page;

acquire pixel values of the pixels in the region; and determine the edge color value according to the acquired pixel values.

13. The device according to claim 12, wherein the at least one processor is further caused to:

determine the edge color value according to the acquired pixel values comprises at least one of the following:

determine, according to the acquired pixel values, the number of color types contained in the region; determining a color corresponding to the pixel values which account for a maximum proportion among all the pixel values as an edge color to be drawn, if the number of color types contained in the region is greater than a second preset threshold and less than a third preset threshold, wherein both the second preset threshold and the third preset threshold are positive integers, the second preset threshold is greater than one and less than the third preset threshold; determining, according to the acquired pixel values, a ratio of the number of color types contained in the region to the number of the acquired pixel values;

determine a color corresponding to the pixel values which account for a maximum proportion among all the pixel values as an edge color to be drawn, if the ratio is greater than a first preset ratio and less than a second preset ratio, wherein the second preset ratio is greater than the reciprocal of the number of the acquired pixel values, and the first preset ratio is less than the second preset ratio;

determine a preset color as the edge color to be drawn if the number of color types contained in the region is greater than or equal to the third preset threshold;

determine the preset color as the edge color to be drawn if the ratio of the number of color types contained in the region to the number of the acquired pixel values is greater than or equal to the second preset ratio; and when there is only one color in the region, determining the color as the edge color.

14. The device according to claim 9, wherein the at least one processor is further caused to:

in response to determining that the transparency value of the currently displayed page indicates opaque, determine a currently displayed page of the electronic book is the image page;

in response to determining that the transparency value of the currently displayed page indicates transparent, determine whether there is at least one of a picture and a decorative background in a region within the preset distance away from the edge of the currently displayed page; and determine that the currently displayed page is the currently displayed image page in response to determining that there is at least one of the picture and the decorative background in the region.

15. The device according to claim 14, wherein the at least one processor is further caused to:

draw the whole folded portion with a default color value of the electronic book page, then draw the page content at the folded portion and display a drawing result, if the transparency value indicates transparent and there is no picture or decorative background in the region within the preset distance away from the edge of the currently displayed page.

16. A terminal device, comprising a processor, a memory, a communication interface and a communication bus, wherein the processor, the memory and the communication interface communicate with each other via the communication bus; and the memory is configured to store at least one executable instruction, wherein the executable instruction causes the processor to perform a method for displaying pages of an electronic book, the method for displaying pages of an electronic book comprising:

determining that a currently displayed page of the electronic book is a currently displayed image page of the electronic book based at least in part on a transparency value of the currently displayed page;

in response to receiving a page turning operation for the currently displayed image page of the electronic book, acquiring an edge color value and page content of the currently displayed image page, wherein the edge color value is a color value at a position within a preset distance away from an edge of the currently displayed image page;

drawing and displaying a folded portion with the edge color value and the page content, wherein the folded portion is a back portion of the currently displayed image page being turned on which the page turning operation is performed;

wherein the drawing and displaying a folded portion with the edge color value and the page content further comprises:

drawing the page content at the folded portion of the currently displayed image page, drawing the whole folded portion with a drawn color corresponding to the edge color value above the drawn page content, reducing a transparency value of the drawn color when a brightness value of the drawn color is less than a first preset threshold, and displaying a drawing result.

\* \* \* \* \*